United States Patent
Reiser

(10) Patent No.: US 6,777,115 B2
(45) Date of Patent: Aug. 17, 2004

(54) BATTERY-BOOSTED, RAPID STARTUP OF FROZEN FUEL CELL

(75) Inventor: Carl A. Reiser, Stonington, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 283 days.

(21) Appl. No.: 10/137,843

(22) Filed: May 1, 2002

(65) Prior Publication Data

US 2003/0207162 A1 Nov. 6, 2003

(51) Int. Cl.[7] ............................................. H01M 8/04
(52) U.S. Cl. .......................... 429/13; 429/22; 429/23; 429/24
(58) Field of Search .......................... 429/13, 22, 23, 429/24

(56) References Cited

U.S. PATENT DOCUMENTS

| | | | | |
|---|---|---|---|---|
| 3,544,380 A | * | 12/1970 | Dey | ............................ 429/13 |
| 5,798,186 A | * | 8/1998 | Fletcher et al. | ............... 429/13 |
| 6,329,089 B1 | * | 12/2001 | Roberts et al. | ............... 429/13 |
| 6,358,637 B1 | * | 3/2002 | Fuss | ............................ 429/12 |
| 6,709,777 B2 | * | 3/2004 | Hagans et al. | ............... 429/13 |

* cited by examiner

Primary Examiner—John S. Maples
(74) Attorney, Agent, or Firm—M. P. Williams

(57) ABSTRACT

A fuel cell stack (7) has an auxiliary load (30) in series with a battery (29) which can selectively (25) be connected across the fuel cell stack in place of a main load (24). A method includes connecting the battery and auxiliary load across the fuel cell stack while providing fuel (13) to the anode flow fields (8, 10); in one embodiment, oxidant (17) is provided to the cathode flow fields (16) initially; in a second embodiment, oxidant is withheld from the cathode flow for a predetermined time or until a threshold voltage is reached.

16 Claims, 2 Drawing Sheets

BATTERY-BOOSTED, RAPID STARTUP OF FROZEN FUEL CELL

TECHNICAL FIELD

This invention relates to using a battery, or other DC source, to force current through a frozen fuel cell stack, thereby to cause it to rapidly become operational.

BACKGROUND ART

Fuel cell power plants are currently being developed for use in powering electric vehicles. In northern climates, the vehicles may at times be subjected to temperatures as low as −30° C. To be successful in powering vehicles, a fuel cell powerplant must be able to produce at least 30% of its rated power within 20 seconds of initiating startup. The most significant problem in fuel cells in cold weather is freezing of water, which is required to keep the polymer exchange membrane (PEM) electrolyte moist, and which is produced at the cathode as a consequence of the electrochemical, current-generating reaction. Frozen water partially blocks passage of the reactant gases through the porous support plates, thereby partially inhibiting the electrochemical process. To deal with this, numerous procedures have been proposed: some of these deal only with removing water from the fuel cell before it is shut down, so that frozen water will not be a problem the next time that the fuel cell is started. For instance, U.S. Pat. No. 6,358,637 suggests evaporating the water out of the fuel cell with a vacuum, while it Is still warm from use, before it is rendered inactive between uses. However, this method is not useful in fuel cells utilizing a porous water transport plate because there is too much water to slowly evaporate into the vacuum stream for removal. Furthermore, since the removal process requires evaporation of the water before it can be removed in the vacuum stream, the power requirements are prohibitive for use in vehicles. In U.S. Pat. No. 6,329,089, it is suggested that starvation of one or both reactants, or periodically drawing a current from the cell, will drive cell voltage to zero producing excess heat which will warm the cells. However, the results indicate that it takes at least tens of minutes to become operational using this method, which is impractical for vehicles. Other suggestions include generating heat externally and applying the heat, either in the form of warm coolant, warm reactant gases, or both directly to the cell, or through a medium warmed through a heat exchanger. Such systems require more on-board power, and component volume than is tolerable in a vehicle.

The simplest way to start a fuel cell stack is to supply fuel and oxidant, typically hydrogen and air, directly to the fuel cell while drawing electrical power from the cell stack across a resistive load, typically an auxiliary load, while the fuel cell stack is still in the frozen state. This is sometimes referred to as a "bootstrap start". This is possible because the fuel cell has some electro-chemical activity as low as −30° C. since a portion of the water in the proton exchange membrane and the ionomer within the catalyst layer does not freeze, due to the phenomena of freezing point depression in the nano-size pores. The problem with the boot strap start is that the product of the electrochemical reaction is water, which accumulates within the porous structure of the catalyst layer, the diffusion layer, and the substrates, until the cell temperature is above freezing. Water/ice accumulation tends to block the porous structures which are required to supply reactants to the catalytic sites. Cell performance typically drops off during a boot strap start because of that. Furthermore, a boot strap start takes several minutes to reach operational temperature. In addition, it has been found that multiple boot strap starts result in decay of cell stack performance during normal operation.

DISCLOSURE OF INVENTION

Objects of the invention include provision of a fuel cell: capable of producing at least 30% of rated power within about 20 seconds of initiating startup; capable of rapid startup with only a small auxiliary power requirement; and becoming operational quickly by means of internally provided heat.

According to the present invention, when starting a frozen fuel cell stack, a DC power supply, which may be a battery or a supercapacitor, is placed in series with the fuel cell stack and a resistive load, typically an auxiliary load, to force more current through the cell than would occur with just a resistive load. According to the invention, additional current provided by the source initially forces the weak cells in the fuel cell stack to a negative cell voltage which produces heat as a consequence of polarizations within the cell; thereby, the performance of the weak cells quickly approaches typical performance of good cells. According further to the invention, while the battery is connected in series with the fuel cell stack, excess fuel, which may be hydrogen or hydrogen-containing fuel, is supplied to the anodes of the fuel cell stack. According to the invention, oxidant may be initially supplied to the cathodes of the fuel cell stack in one embodiment, or, in a second embodiment, the application of oxidant to the fuel cell stack may be delayed until a predetermined time delay from when the current forcing begins or until the stack voltage reaches a predetermined threshold voltage, thereby causing the cells to operate as hydrogen pumps.

In accordance with a first embodiment of the invention, excess fuel and excess air are supplied to the fuel cell stack electrodes while a fixed, predetermined current density is imposed on the fuel cell stack, in a range of between 100 mASC and 500 mASC, which may be about 250 mASC for a 75 KW fuel cell stack, by means of the DC power supply and the auxiliary load. At this current density, the good cells will have positive voltages while the poorer cells will be driven negative by as much as one volt. The current produced in the poor cells is initially due to the reduction of oxygen, until the cell voltage goes negative. Thereafter, the current produced in the cells is due to hydrogen evolution. No water is produced as a consequence of a negative cathode voltage, because the cathode will simply evolve hydrogen by the process $$2H^+ + 2e^- \rightarrow H_2.$$

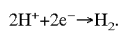

Therefore, the reaction is not hampered by the water/ice formation as is the case in a boot strap start. Furthermore, for any hydrogen-containing fuel, the anode reaction is a much faster reaction than the cathode reaction $$\tfrac{1}{2}O_2 + 2H^+ + 2e^- \rightarrow H_2O.$$

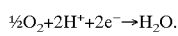

Thus, the objective is to supply plenty of hydrogen to the cell stack assembly during startup. Furthermore, the hydrogen evolved when a cell is driven to a negative voltage can react upon the catalyst within the cathode with the air flowing through the cell to quickly raise the cell temperature. The cell voltage begins to become more positive as the cell heats and eventually the cell reaches typical, operational performance levels.

According to the second embodiment of the invention, the foregoing is enhanced by withholding the application of air to the fuel cell stack during the initial phase of the startup procedure. Instead, hydrogen is supplied to the anode flow fields and then a DC power supply in series with an auxiliary load is connected across the stack to produce a fixed, predetermined current density through the fuel cell stack, for example, of about 250 mASC for a 75 KW fuel cell stack.

This forces the fuel cell to function as a hydrogen pump, with hydrogen being evolved at the cathode and consumed at the anode. The polarizations associated with these reactions, and the current flow through the PEM, heat the cells. After a predetermined time interval or establishment of a predetermined cell voltage, air is supplied to the cathode flow fields in sufficient quantity to support the desired current. The battery is thereafter maintained in the circuit until the fuel cell stack voltage indicates that the average cell voltage is positive. Then, the battery and the resistive load are disconnected while the primary load is connected, the process being complete.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
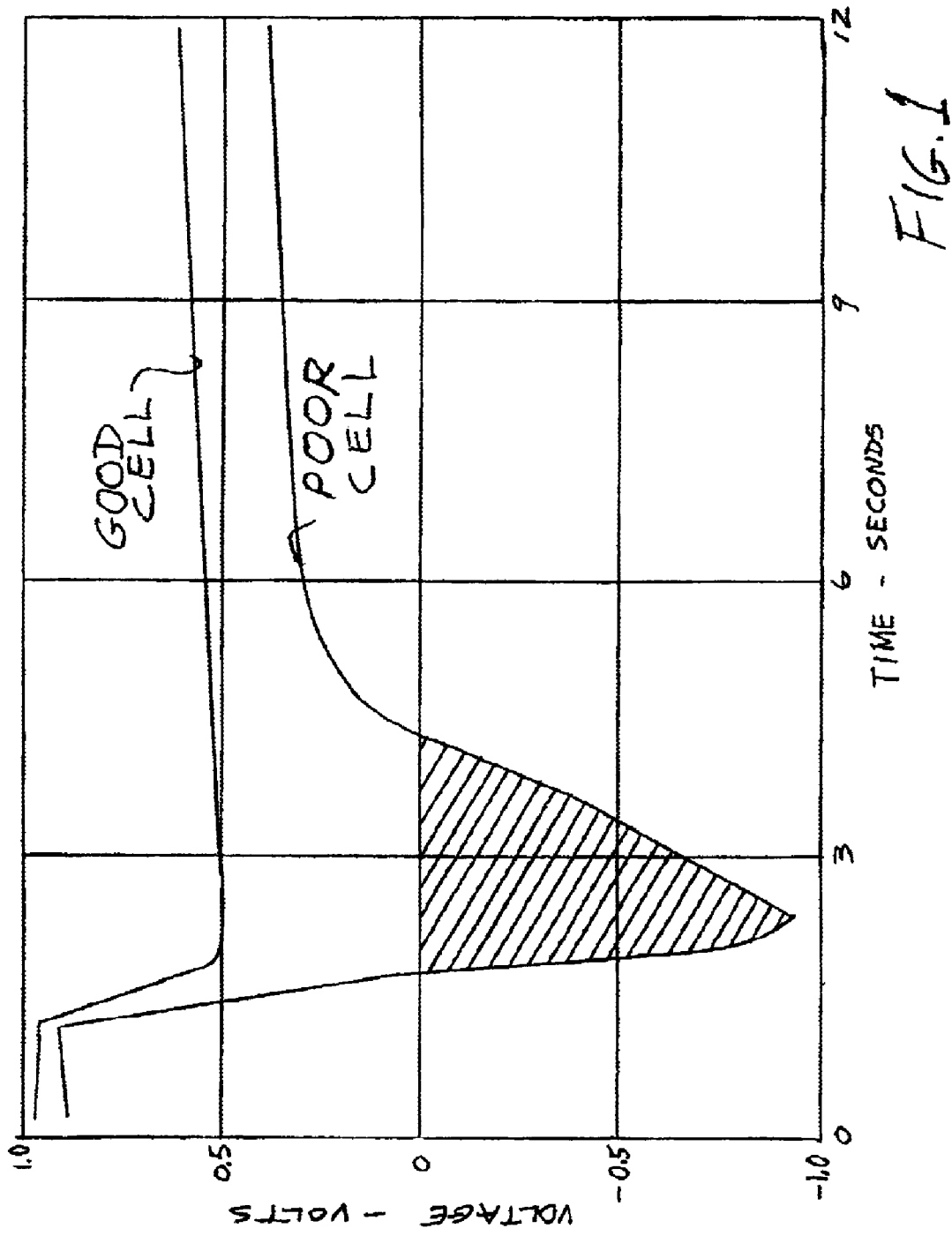
FIG. 1 is a plot of voltage as a function of arbitrary time during a fuel cell startup according to the present invention.

A frozen fuel cell with an active area of 0.4 square feet, a Gore 5561 membrane electrode assembly obtained from W. L. Gore and Associates of Elkton, Md. with wettable cathode and anode substrates, no diffusion layer on the anode substrate, a 25 micron, 10% Teflon diffusion layer on the cathode substrate, and both anode and cathode water transport plates was started in accordance with the invention. In FIG. 1, the upper trace is of a good cell which is capable of producing electricity as soon as the reactants are provided thereto, and the lower trace is of a weak cell which, when reactants are applied to it, will have an inverse polarization, with the cathode going negative. FIG. 1 illustrates, that with the use of the present invention, the voltage in the weak cell remains negative for only about three seconds, and approaches positive 400 millivolts about only 10 seconds after application of hydrogen to the cells. Thus, the invention will permit reaching at least 30% of rated load in less than 30 seconds.

Figure 2:
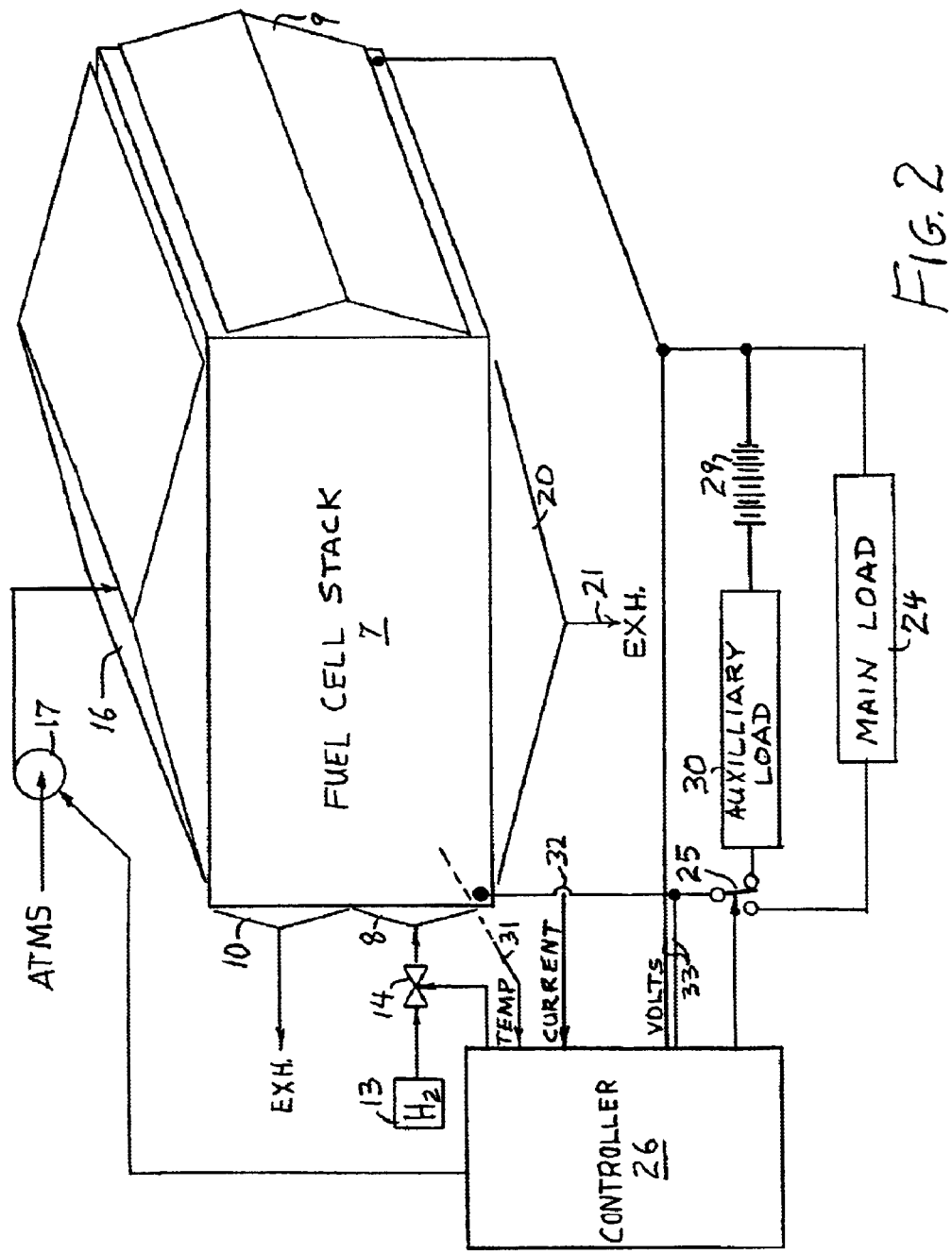
FIG. 2 is a simplified, schematic illustration of a fuel cell system employing the present invention.

Referring to FIG. 2, a fuel cell stack 7 has a fuel inlet manifold 8, a fuel turnaround manifold 9, and a fuel exhaust manifold 10. Fuel is supplied from a source of hydrogen 13 through a fuel pressure control valve 14. The fuel may be exhausted to a suitable recovery device, which is irrelevant to the present invention and not shown for clarity. The stack 7 also has an oxidant inlet manifold 16 which receives air provided by a pump 17 from atmosphere. The stack 7 also has an oxidant exit manifold 20 which exhausts oxidant through a line 21 to exhaust, which may either be a recovery device or atmosphere. The fuel cell contains positive and negative current collector plates, as is conventional, which are not shown for clarity. A main load 24 is connected electrically across the entire fuel cell stack when a start switch 25 is set to a position opposite to the position shown in FIG. 2, such as by means of a controller 26. In accordance with the invention, the fuel cell stack may also be connected through a DC power source, such as a super capacitor or a battery 29 to an auxiliary load 30 when the start switch 25 is in the position shown in FIG. 2. The controller 26 may respond to temperature, which may be taken at several points within the stack, or at a particular, suitable point which can be determined empirically, as indicated by line 31, as well as responding to current through the load, as indicated by a current sensor 32, and either voltage across the stack, as indicated by lines 33, or voltage across individual cells (not shown).

It is assumed that the fuel cell stack will undergo an appropriate shutdown procedure to remove as much water as possible from the stack 7 whenever operations are being terminated with the possibility of sub-freezing temperatures to follow. One such procedure is described in commonly owned, copending U.S. patent application Ser. No. 09/826,739, filed Apr. 5, 2001. Any other suitable water removal procedure may be utilized. The stack cooling system is not shown for clarity; coolant is not circulated during the startup procedure of the invention so that all generated heat will serve to raise cell temperatures; all ice within the cell stack will normally be melted before coolant circulation begins. As is known, the coolant may be water, or it may be an antifreeze solution which could be circulated at temperatures below freezing; however, that would interfere with warming of the fuel cell stack. The coolant may be heated externally of the cell stack as is known; but, the coolant is not circulated through the stack before the coolant temperature is higher than 0° C.

In accordance with one embodiment of the invention, to initiate startup, the controller 26 will open the valve 14 and start the air blower 17. These flows will initially provide hydrogen for 80% or lower fuel utilization at the predetermined current density, and sufficient air at that predetermined current density. Then, the controller 26 will move the switch 25 to the position shown in FIG. 2, thereby connecting the battery 29 and auxiliary load 30 across the fuel cell stack. The battery 29 and auxiliary load 30 are selected so as to ensure a current density within the fuel cell stack within a predetermined range, such as between 100 mASC and 500 mASC, which may, for instance, be on the order of 250 mASC for a 75 KW PEM fuel cell stack. When the voltage level of the cell stack is above a threshold voltage, such as zero volts, indicating that the average cell voltage is positive, the air valve 21 may be adjusted for 60% or some other air utilization, and the switch 25 transferred so as to connect the main load 24 across the fuel cell stack. Then, current density will be determined by the main load 24. However, if the controller thereafter senses, within a minute or so, that the voltage of the fuel cell stack is decreasing, it may transfer the switch 25 to remove the main load and reconnect the auxiliary load and DC source, until the voltage is no longer decreasing and is positive; this re-start activity may be repeated several times.

In additional embodiments of the invention, the valve 14 is first opened so as to provide more than adequate hydrogen, that is, 80% utilization or lower at the predetermined startup current density, such as 250 mASC, and the battery 29 and auxiliary load 30 are connected across the fuel cell stack 7. In one embodiment, air is not supplied to the cell stack until after the controller has established that an empirically determined time interval has been met, such as a large fraction of a second. In another embodiment, air is not supplied to the cell stack until after the controller has established that the cell stack voltage exceeds an empirically determined threshold voltage, such as a negative fraction of a volt. Then air is supplied to the cathode flow fields in sufficient quantity to support the desired current density. The battery 29 and auxiliary load 30 remain connected until the average voltage of all cells is greater than zero volts at that time, the controller transfers the startup switch 25 to the position opposite to that shown in FIG. 2, so that the battery and auxiliary load are disconnected and the main load is connected across the fuel cell stack.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell system which will start up when frozen, comprising:
   a fuel cell stack including a plurality of contiguous cells, each cell having an anode with a fuel flow field;
   means for applying fuel to said fuel flow field; and
   means for externally forcing current through said fuel cell stack to initially provide current density in said cells of at least a predetermined magnitude.

2. A fuel cell system according to claim 1, further comprising:
   a main load; and wherein;
   said means for externally forcing current comprises;
   a series circuit including a DC power source in series with an auxiliary load, said source and said load selected to cause an initial current density of at least said predetermined magnitude in said fuel cell stack during startup;
   a switch for alternatively connecting either said main load or said series circuit electrically across said fuel cell stack; and
   a controller for applying fuel from said source to said fuel flow fields and subsequently causing said switch to connect said series circuit across said fuel cell stack.

3. A system according to claim 2 further comprising:
   a source of oxidant; and wherein
   each of said fuel cells comprises a cathode with an oxidant flow field; and
   said controller applies oxidant from said source of oxidant to said oxidant flow fields prior to said series circuit being connected across said fuel cell stack.

4. A system according to claim 2 further comprising:
   a source of oxidant; and
   means for indicating a voltage level within said fuel cell stack; and wherein
   each of said fuel cells further comprises a cathode with an oxidant flow field; and
   said controller is responsive to time or to said voltage level indicating means to apply oxidant from said oxidant source to said oxidant flow fields either (1) a preselected time after said series circuit is connected across said fuel cell stack or (2) only after the voltage level across said fuel cell stack exceeds a threshold voltage level.

5. A system according to claim 2 wherein:
   said DC source is one of a battery and a super capacitor.

6. A startup method for a frozen fuel cell stack including a plurality of contiguous cells, each cell having an anode with a fuel flow field, said method comprising:
   applying fuel to said fuel flow fields; and
   then externally forcing current through said fuel cell stack to initially provide current density in said cells of at least a predetermined magnitude.

7. A startup method according to claim 6 for a frozen fuel cell stack in which each cell has a cathode with an oxidant flow field, said method further comprising:
   monitoring a voltage across said fuel cell stack;
   providing excess fuel to said fuel flow fields and excess air to said oxidant flow fields; and
   connecting a normal load to said fuel cell stack in place of externally forcing current through said fuel cell stack when said voltage indicates that the average cell voltage is positive.

8. A method according to claim 7 further comprising:
   disconnecting said normal load and resuming externally forcing current through said fuel cell stack in the event that said voltage decreases within a short time of connecting said normal load to said fuel cell stack.

9. A startup method according to claim 6 for a frozen fuel cell stack in which each cell has a cathode with an oxidant flow field, said method further comprising:
   monitoring either (1) a time interval following initiating said step of forcing or (2) a voltage across said fuel cell stack;
   providing excess oxidant to said oxidant flow fields either (1) after a predetermined time following initiating said step of forcing or (2) when said voltage exceeds a predetermined voltage; and
   connecting a normal load to said fuel cell stack in place of externally forcing current through said fuel cell stack when said voltage indicates that the average cell voltage is positive.

10. A method according to claim 9 further comprising:
    disconnecting said normal load and resuming externally forcing current through said fuel cell stack in the event that said voltage decreases within a short time of connecting said normal load to said fuel cell stack.

11. A method according to claim 6 wherein said predetermined magnitude is between 100 mASC and 500 mASC.

12. A method according to claim 6 further comprising:
    monitoring a temperature within said fuel cell stack; and
    circulating coolant through said fuel cell stack when said temperature indicates that said fuel cell stack is above freezing temperature.

13. A method according to claim 12 further comprising:
    heating coolant; and
    circulating coolant through said fuel cell stack when said temperature indicates that said fuel cell stack is above freezing temperature or said coolant is above freezing temperature.

14. A method for startup of a frozen fuel cell stack comprising:
    providing fuel to said fuel cell stack; and
    then connecting a DC source in series with an auxiliary load electrically across said fuel cell stack, said source and said load selected to initially provide a predetermined current density in said fuel cell stack.

15. A method according to claim 14 further comprising:
    monitoring a temperature within said fuel cell stack; and
    circulating coolant through said fuel cell stack when said temperature indicates that said fuel cell stack is above freezing temperature.

16. A method according to claim 15 further comprising:
    heating coolant; and
    circulating coolant through said fuel cell stack when said temperature indicates that said fuel cell stack is above freezing temperature or said coolant is above freezing temperature.

* * * * *